United States Patent [19]

Bruder

[11] Patent Number: 5,283,646
[45] Date of Patent: Feb. 1, 1994

[54] QUANTIZER CONTROL METHOD AND APPARATUS

[75] Inventor: John E. Bruder, Arlington, Mass.

[73] Assignee: PictureTel Corporation, Peabody, Mass.

[21] Appl. No.: 866,027

[22] Filed: Apr. 9, 1992

[51] Int. Cl.$^5$ ............................................. H04N 1/41
[52] U.S. Cl. .................................. 348/415; 358/429; 341/76; 341/77; 375/27; 348/420
[58] Field of Search ..................... 358/136, 138, 429; 341/76, 77; 375/27

[56] References Cited

U.S. PATENT DOCUMENTS

| | | | |
|---|---|---|---|
| 4,549,304 | 10/1985 | Weirich et al. | 341/77 |
| 5,038,209 | 8/1991 | Hang | 358/136 |
| 5,089,888 | 2/1992 | Zdepski et al. | 358/136 |
| 5,144,424 | 9/1992 | Savatier | 358/136 |
| 5,144,426 | 9/1992 | Tanaka et al. | 358/136 |

Primary Examiner—Edward L. Coles, Sr.
Assistant Examiner—Kimberly A. Williams
Attorney, Agent, or Firm—Fish & Richardson

[57] ABSTRACT

A method and apparatus for enabling a real time video encoding system to accurately deliver the desired number of bits per frame, while coding the image only once, updates the quantization step size used to quantize coefficients which describe, for example, an image to be transmitted over a communications channel. The data is divided into sectors, each sector including a plurality of blocks. The blocks are encoded, for example, using DCT coding, to generate a sequence of coefficients for each block. The coefficients can be quantized, and depending upon the quantization step, the number of bits required to describe the data will vary significantly. At the end of the transmission of each sector of data, the method and apparatus of the invention compare the accumulated actual number of bits expended with the accumulated desired number of bits expended, for a selected number of sectors associated with the particular group of data. The system then readjusts the quantization step size to target a final desired number of data bits for a plurality of sectors, for example describing an image. Various methods are described for updating the quantization step size and determining desired bit allocations.

14 Claims, 5 Drawing Sheets

QUANTIZER CONTROL METHOD AND APPARATUS

BACKGROUND OF THE INVENTION

The invention relates to the transmission of quantized data through a communications channel, and in particular, to the transmission of block encoded video or image data through a bandwidth limited communications channel.

Most image and video compression systems, at some point, must decide how to allocate available transmitter bits to the image or frame of video to be compressed. A variety of methods have been developed by those working in this field to predict how many bits are needed to achieve some average distortion over the frame. Unfortunately, these methods assume a model for the statistics of the data to be compressed which seldom accurately represents the true underlying statistics, and the actual bits generated will generally differ from the number predicted. If the actual number of bits is less than the predicted number of bits, some bandwidth of the communications channel is likely to be wasted. On the other hand, if the actual number of bits is greater than the predicted number of bits there may result either buffer overflow and a resulting loss of information and increased distortion of the reconstructed image, or frame skipping while these extra bits are transmitted from transmitter to receiver. If a precise number of bits is required, one can iteratively converge to the "optimal" allocation by repeatedly encoding the image and adjusting the bit allocation. This is not suitable, however, for real time systems, which often have time to encode each image frame only once.

In accordance with a recently adopted standard (CCITT H.261) for encoding image data representative of a sequence of two-dimensional arrays of image data, the two-dimensional array is divided into a plurality of blocks, each block being an 8×8 sub-array of image representing data. Each block of data is encoded in accordance with the standard and is transmitted to a remote receiver which reconstructs the encoded blocks and thus reconstructs the entire image. The CCITT H.261 standard provides for 31 different quantizer step sizes for use in the encoding process. During the encoding process, varying the quantizer step size will dramatically change, over the full range of available step sizes, the number of bits needed to code a sequence of blocks. In accordance with the standard, the encoder sends a quantizer step size to the receiver for each so-called "Group of Blocks" (GOP). The encoder can also change the quantizer at the "macroblock" (MB) level using a so-called MTYPE signaling of a new quantizer step size followed by 5 bits of quantizer information. Thus, if one were able to accurately predict the needed step size, the number of bits used to describe a complete image can be reasonably controlled.

Accordingly, it is an object of the invention to provide a method and apparatus for accurately optimizing the number of bits transmitted for an image to achieve a selected target number of bits when the image is complete. Other objects of the invention are methods and apparatus for selecting an initial quantizer step size, and accurately and precisely controlling step size so that the number of bits allocated to the image does not provide either an overflow condition or an underflow condition.

SUMMARY OF THE INVENTION

The invention relates to a method for transmitting a selected number of bits for representing an encoded image. The number of bits being transmitted will be a function of a quantizer step size, in accordance with the preferred embodiment of the invention, wherein various parameter values describing the image are quantized prior to transmission. The image is formed from a plurality of sectors, typically designated a Group of Blocks (GOB) in accordance with the CCITT H.261 standard. Each sector typically has a plurality of blocks. The blocks are 8×8 sub-arrays of data. Further, in accordance with the H.261 standard, a group of six blocks form a so-called "macroblock," the plurality of macroblocks then combining to form a GOB. The method features the steps of determining a desired number of bits to be allocated to each sector, transmitting the sectors in a selected sequence, and associating a quantizer step size with each transmitted sector. The associating step features setting the quantizer step size for a sector as a function of the difference in the number of bits actually transmitted for all previous sectors of the image frame and the desired number of bits to be transmitted for all previous sectors of the image.

In another aspect of the invention, a method for transmitting the selected number of bits for representing the encoded image, the number of transmitted bits being a function of the quantizer step size and the image being comprised of a plurality of sectors each sector having a plurality of blocks, provides for allocating the available bits to blocks of the image to be encoded according to the relationship:

$$B(n) = (B_d(n)/N(n)) + \tfrac{1}{2}Log_2(E(n)/E_{TOT}(n)))$$

where
B(n) is the number of bits allocated to block B for frame n;
N is the number of blocks of frame n actually coded;
$B_d(n)$ is the desired number of bits allocated to code frame n;
E(n) is the prediction error energy for Block B of frame n (wherein the DC component is omitted for intra-blocks); and
$E_{TOT}(n)$ is the geometric mean of energy for all blocks (N) actually to be coded for frame n.

In yet another aspect of the invention, a method for selecting an initial quantizer step size for use in encoding an image frame, the frame including a plurality of sectors and each sector being divided into a plurality of blocks, features the steps of selecting a quantizer step size equal to the quantizer step size of a previously encoded frame, and adjusting the selected step size by a weighted function of the difference between the actual number of bits used to encode the previous frame and the desired number of bits for encoding the present frame, the weighting function being a preselected first constant divided by the expected number of blocks to be encoded for this frame, and adjusting the now modified selected quantizer step size a second weighted function of the logarithm, to the base two, of the ratio of the geometric mean of the total energy of the blocks actually to be encoded for this frame times the number of blocks expected to be encoded for this frame, and the geometric mean of the total energy of the blocks actually encoded for the previous frame times the number of blocks expected to be encoded for the previous frame.

BRIEF DESCRIPTION OF THE DRAWINGS

Other objects, features, and advantages of the invention will be apparent from the following description, taken together with the drawings in which.

DESCRIPTION OF A PREFERRED EMBODIMENT OF THE INVENTION

The invention relates generally to any video or image compression system in which a real time video encoding system needs to accurately deliver a desired number of bits per frame when encoding the image only once. In the illustrated embodiment which follows, the invention is applied to a DCT coding system for encoding video sequences, for example in accordance with the CCITT H.261 or ISO MPEG video compression standards. It can, however, as will be apparent to those practicing in this field, also be applied in other ways to single frame image compression systems, for example the ISO JPEG DCT image compression standard, and nontransform-based quantizers, including sub-band and spatial domain compression systems using scaler and vector quantizers.

I. System Overview

Figure 1:
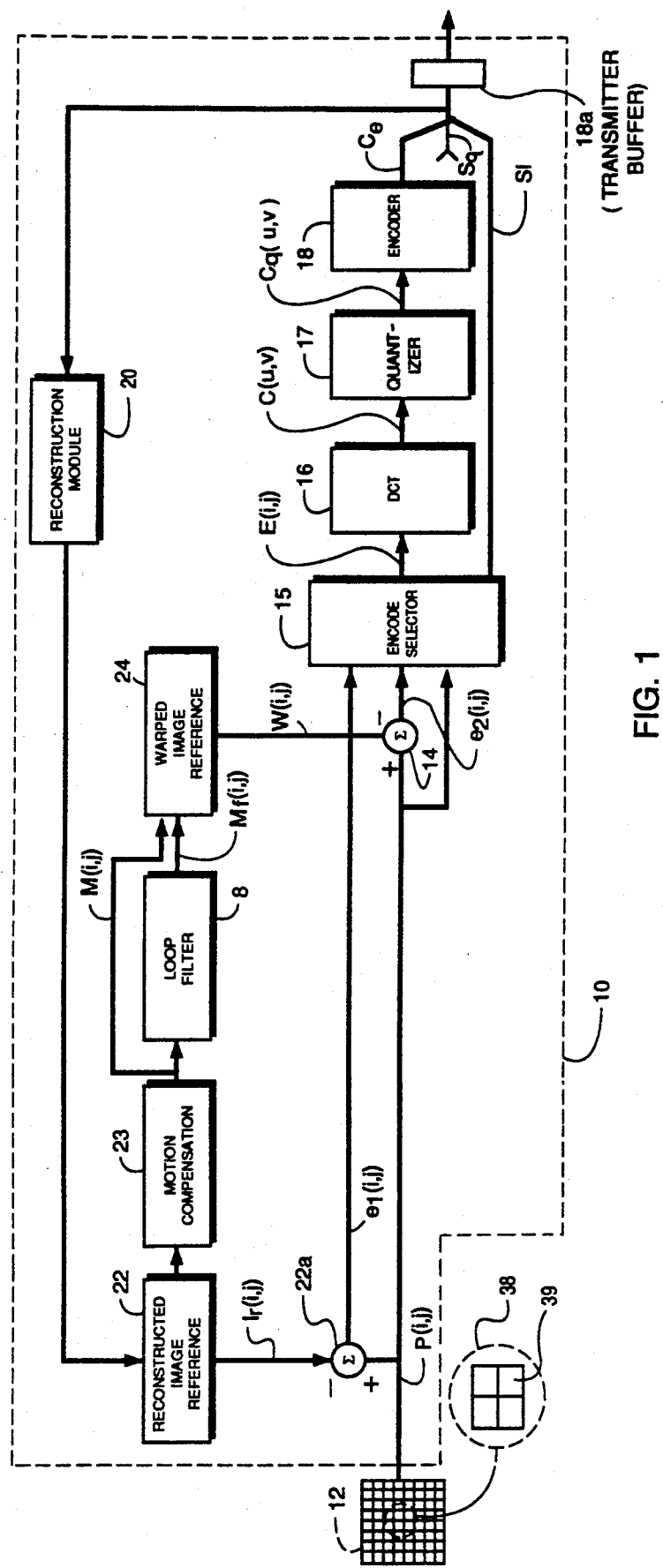
FIG. 1 is a block diagram of a transmitter for encoding image data using a block encoder.
Figure 2:
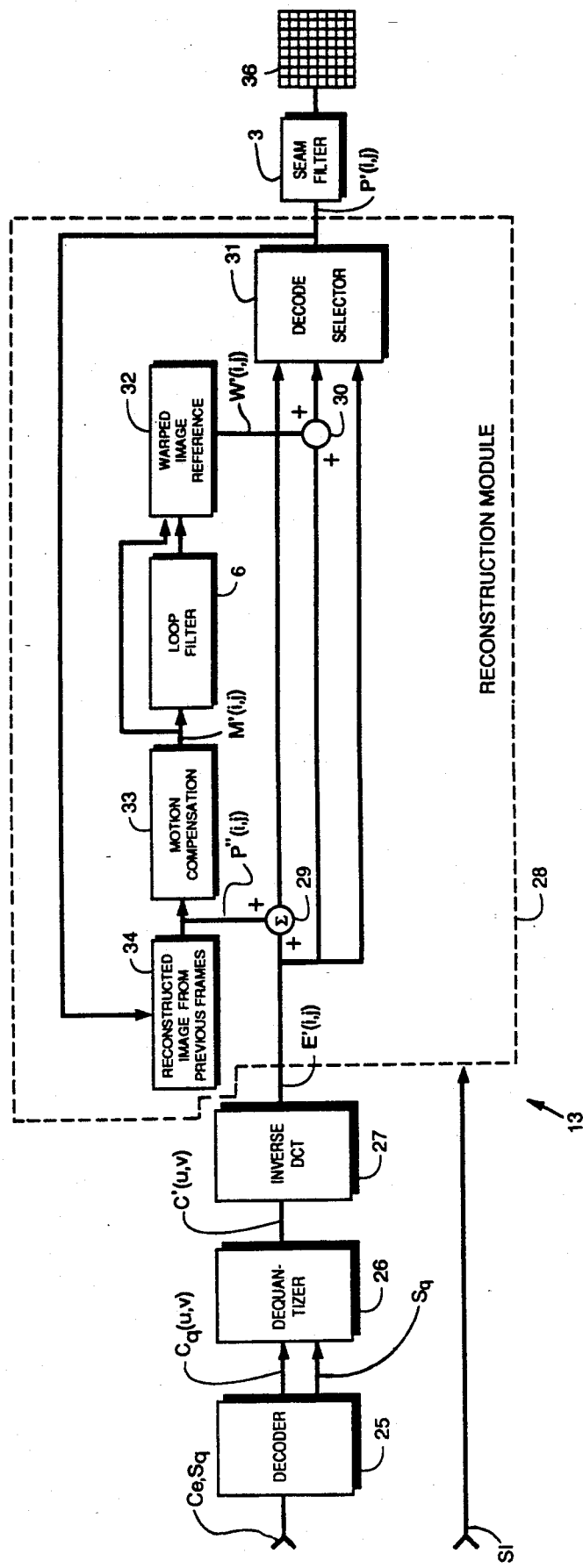
FIG. 2 is a block diagram of a receiver for decoding image data received from the transmitter to reconstruct the image.

Referring to FIGS. 1 and 2, a system in which the invention has been implemented under the CCITT H.261 standard has a transmitter 10 for encoding image data representative of an image 12 and for transmitting the encoded image data to a receiver 13 (FIG. 2) which reconstructs the image from the encoded data and displays it at a remote location. Image 12 consists of luminance and chrominance components.

The transmitter 10 separates the image into an array of macroblocks 38 wherein each macroblock includes a 16×16 sub-array of pixel luminance data and two 8×8 blocks of chrominance data. Each macroblock 16×16 point sub-array is further divided into four blocks 39 each including an 8×8 sub-array of pixel luminance data.

The transmitter is typically capable of encoding each macroblock of data using a variety of encoding methods. For each macroblock of data, the transmitter selects that encoding method which requires the fewest number of bits to describe the macroblock of data.

One class of such methods is referred to as "interframe" encoding. Interframe encoding techniques define each block of image data in terms of the differences between the block of data and a reference block of data. The transmitter transmits the difference information to the receiver. Since the receiver maintains copies of the reference images, it can reconstruct the block of data by combining the difference information with the reference image.

Another technique is referred to as "intraframe" encoding. According to this technique, the transmitter transmits the original block of data, encoded, to the receiver. In effect, intraframe encoding describes each block of data in terms of the differences between the block of data and a zeroed reference block (a block in which each pixel data equals zero).

The transmitter may also send no information regarding a block of data. This tells the receiver that the corresponding block for the last frame should be used as the block for the current frame.

In the illustrated embodiment, the interframe encoding method uses the most recently "transmitted frame" as a reference. Accordingly, as shown in FIG. 1, the transmitter includes a reconstruction module 20 which reconstructs each frame of the sequence of images from the transmitter's own transmission signal in a manner similar to the reconstruction process performed at the receiver. The transmitter stores the reconstructed image in a reconstructed frame reference memory 22.

For each block of "raw" pixel data $P(i,j)$, a subtractor $22a$ calculates the difference between the pixels $P(i,j)$ of the block and a corresponding block of pixels $I_r(i,j)$ in the reconstructed frame. The resultant error signal $e_1(i,j)$ is provided to an encode selector 15 for determining whether $e_1(i,j)$ will provide a more bit efficient representation of the block of data than the other encoded representations described below.

A second interframe encoding method prepares, for each block to be transmitted, a warped image reference. Toward this end, a motion compensation module 23 searches for an 8×8 block of data $M(i,j)$ in the reconstructed image 22 which closely matches the block to be coded. A switchable loop filter 8 typically filters the selected block. However, the filtered output $M_f(i,j)$ is only used if it more closely matches the pixel data $P(i,j)$ than the unfiltered version $M(i,j)$. The selected block of data ($M(i,j)$ or $M_f(i,j)$) is stored in a warped image reference memory 24 for use as a reference $W(i,j)$ in encoding the block.

A second subtractor 14 subtracts each pixel of the input block $P(i,j)$ to be coded from the corresponding pixel of the warped block $W(i,j)$. The resultant error signal $e_2(i,j)$ therefore represents the block in terms of the difference between the original block and the warped reference block. Since the receiver can prepare the same warped reference block, it can reconstruct the original block by combining the error signal $e_2(i,j)$ and the warped reference block $W(i,j)$. The error signal $e_2(i,j)$ is also supplied to the encode selector 15 for comparison with the other candidate representations of the block.

Other interframe encoding methods are well known to those skilled in the art. However, the above techniques are used as examples to illustrate the operation of the transmitter.

Finally, for purposes of intraframe encoding, the original pixel data for the block $P(i,j)$ is supplied to the encode selector 15. For each macroblock, the encode selector determines whether to a) transmit the block as represented by one of the above described forms of encoding, or b) send no information regarding the block thereby instructing the receiver to repeat the same block from the previous frame. For purposes of describing the further processing of each block, the signal representation selected by the encode selector is referred to as pixel error data E(i,j).

Each selected 8×8 block of pixel error data E(i,j) is supplied to a two dimensional discrete cosine transform module (DCT) 16 which converts the 8×8 array of pixel error data E(i,j) into an 8×8 array of transform coefficients C(u,v). As is known in this field, the DCT transform is related to the Discrete Fourier Transform (DFT). Accordingly, the two dimensional array of discrete transform coefficients C(u,v) represents the two dimensional "spatial frequencies" within the block of pixel error data. The discrete cosine transform coefficient C(1,1) in the upper left hand corner of the coefficient array represents the DC component of the array of pixel error data. The remaining coefficients are referred to as the "AC coefficients". Each AC coefficient represents a spatial frequency component of the block of pixel error data.

The array of DCT coefficients is supplied to a quantizer 17 which quantizes each coefficient by dividing the coefficient by a selected quantization step size. The quotient is rounded to the nearest integer to form a quantized coefficient $C_q(u,v)$. Accordingly, the quantized coefficients represent the array of DCT coefficients using fewer bits than the original DCT coefficients. The magnitude of step size used to quantize the coefficients is therefore chosen to control the number of bits required to represent the array. Preferably, the step size is chosen such that the quantized coefficients represent the original coefficients as accurately as possible using the number of bits allocated for transmission of the image data.

Each quantized coefficient $C_q(u,v)$ is supplied to an encoder 18 which further encodes the quantized coefficients, loads the data to be transmitted into a transmitter buffer 18a, and transmits the encoded coefficients $C_e$ and the selected quantization step size $S_q$ to the receiver 13.

Referring to FIG. 2, the receiver includes a decoder 25 which decodes the received coefficients $C_e$ to reproduce the quantized coefficients $C_q(u,v)$. Because the encoder 18 and decoder 25 are lossless, the quantized coefficients $C_q(u,v)$ reproduced by the decoder 25 are identical to those generated by the transmitter's quantizer 17, in the absence of transmission error.

A de-quantizer 26 multiplies each quantized coefficient $C_q(u,v)$ by the transmitter determined step size $S_q$ to produce the received coefficients C'(u,v). The received coefficients differ from the original coefficients C(u,v) due to the rounding operation performed by the transmitter. The error introduced by this rounding operation is referred to as the "quantization error".

The received coefficients C'(u,v) are supplied to an inverse DCT module 27 which converts the received coefficients back to an 8×8 array of pixel (error) data E'(i,j). A reconstruction module 28 reconstructs the pixel data P'(i,j) from the pixel error data E'(i,j).

More specifically, if intraframe encoding was used, a decode selector 31 treats the pixel error signal E'(i,j) as the reconstructed pixel data P'(i,j) without further processing. If interframe encoding was employed, the reconstruction module combines the error signal E'(i,j) with the appropriate reference image data to reconstruct the pixel data. For example, if the previous reconstructed frame was used as a reference, an adder 29 combines the pixel error data E'(i,j) with the reconstructed image data P''(i,j) from the previous frame buffer 34 to form the reconstructed pixel data P'(i,j) for the current frame. If the warped reference was used, a motion compensation module 33 prepares a motion compensated block M(i,j). If the motion compensated block was filtered at the transmitter, (as indicated by side information sent by the transmitter), a loop filter 6 filters the motion compensated block M'(i,j) and stores the result as a warped reference W'(i,j) in a warped reference store 32. A second adder 30 combines the received error signal E'(i,j) with the warped reference W'(i,j) to form the reconstructed pixel data P'(i,j). The reconstructed pixel data P'(i,j) is supplied to a reconstructed image store and previous frame buffer 34 for storing the reconstructed image.

The invention is directed to a dynamic operation of the quantizer 17 to minimize the likelihood that either too many or too few bits are generated for each frame of the image to be transmitted. Thus, a video compression system using the described quantizer control method is less likely to generate too many bits per frame (which forces the encoder to skip one or more succeeding frames while waiting for the transmission output buffer to empty) or too few bits per frame (which causes the transmission output buffer to under run, wasting channel bandwidth and excessively impairing image quality). Furthermore, the ability to examine the current frame's entire error image prior to deciding how to quantize and encode it, coupled with its feedforward control structure for predicting a target bit rate and quantizer step size, helps insure a more accurate estimate of the correct quantizer step size, minimizing step size variation over the frame and resulting in a decoded frame having more uniformly distributed error. Thus the system achieves a more constant frame rate and better image quality per frame than conventional quantizer control methods which only key on instantaneous buffer fullness or examine only a portion of the error image.

The method and apparatus of the invention use a feedforward bit allocation formula to compute the desired number of bits for the current frame. A feedforward state equation then selects a suitable initial quantizer step size for the current frame, using the step size from the previous frame, corrected by a measurement of the relative change in prediction error image energy. Bits are then allocated to all blocks using a conventional bit allocation formula. This predicted allocation is used in an additional feedback control loop to periodically refine quantizer step size while the prediction error frame is encoded, driving the actual bits generated to more closely approximate the desired number of bits even if the original prediction mechanism was poor or inaccurate.

Figure 3:
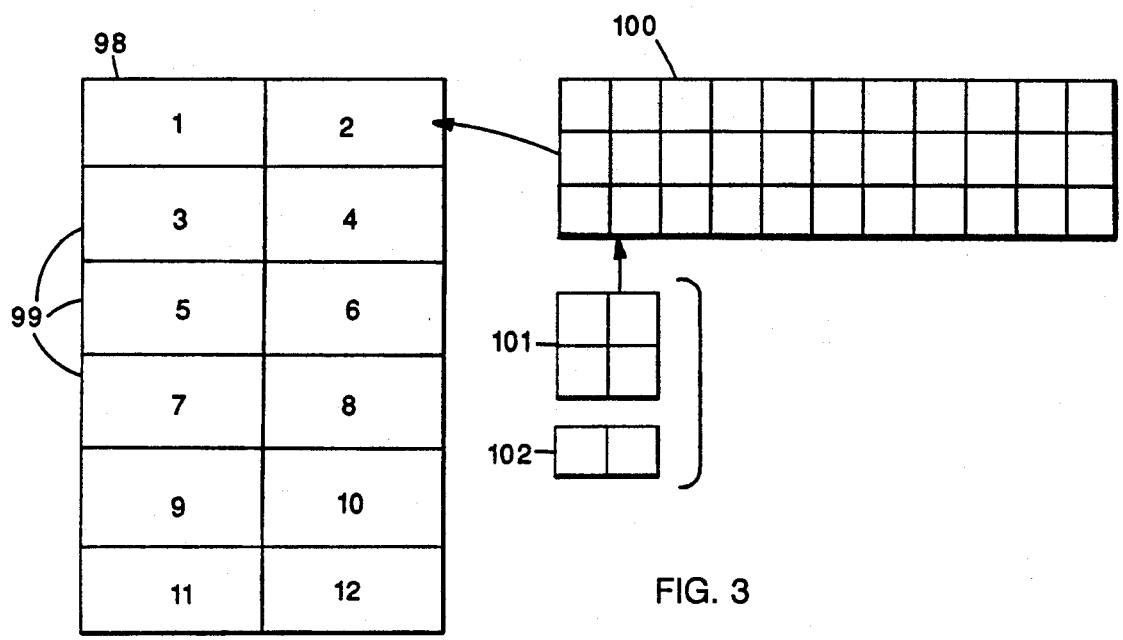
FIG. 3 is an illustrative diagram representing the image pixel data structure in accordance with a preferred embodiment of the invention.

In accordance with the illustrated embodiment of the invention, referring to FIG. 3, a particular image field, in accordance with the CCITT H.261 video conferencing compression standard, has a pixel array 98 of 352 pixels in the horizontal direction and 288 pixels in the vertical direction. The image frame is divided into 12 GOB's 99 which, for convenience, have been numbered 1-12. Each GOB has, in accordance with the standard, 33 macroblocks, the array of macroblocks having an 11×3 array configuration, labeled 100, in FIG. 3. Each macroblock noted above, contains a 16×16 luminance sub-array 101 comprised of four 8×8 blocks, and further has two 8×8 chrominance blocks 102.

Figure 4:
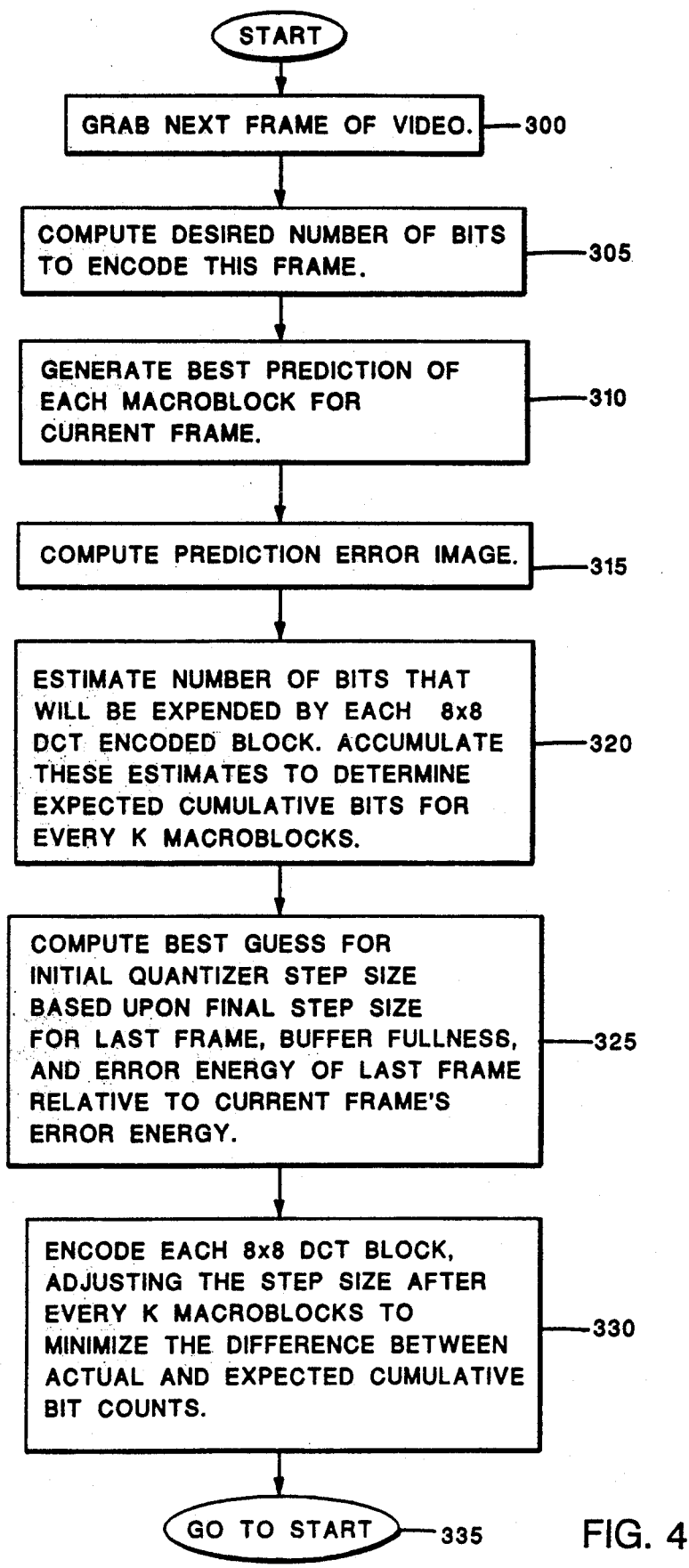
FIG. 4 is a flowchart describing, in general terms, overall operation of the apparatus of FIGS. 1 and 2 in accordance with a preferred embodiment of the invention.

Referring now to FIG. 4, the encoder grabs a new frame of video from the camera at 300. The encoder determines the number of bits desired to encode this frame at 305, based on the instantaneous fullness of transmission buffer 18a and the instantaneous transmitter video frame rate R of the encoder. The goal is to achieve this number of bits for the frame as closely as possible.

The encoder then searches at 310 for the best prediction of each macroblock in the current frame. Under the H.261 standard, predictions can be a copy of the corresponding macroblock from the previous frame (frame differencing), a copy of a macroblock from the corresponding neighborhood in the previous frame (motion compensation 23, FIG. 1), and possibly intra-macroblock filtering (loop filter 8 and its associated control switch) or the macroblock can be intraframe encoded (equivalent to using a block of zeros for the prediction). This often occurs when a macroblock corresponds to a patch of uncovered background, lighting change, object occlusion, rapid motion, or a scene change.

Subtractor 14 and encode selector 15 form the prediction error image $e_2(i,j)$ at 315. DCT encoder 16 and quantizer 17 are implemented at 320, 325, and 330. The number of bits which each 8×8 block of luminance or chrominance pixels will expend, using a well known iterative method described in more detail below, is estimated at 320; however, no bits are generated yet. Only computed estimates, using a formula that makes assumptions about the underlying statistics of the actual prediction errors, have been determined. At low channel bit rates (for example, 128 Kbit/s), many blocks will be found to be allocated no bits because their prediction error energies are too low to waste bits to correct them. At 320, then, the encoder uses the block-by-block bit allocation estimates to compute the total number of bits expected to be expended after encoding every K macroblocks. In this illustrated embodiment, K equals 33, the number of macroblocks in the CCITT's Group of Blocks. (Under the H.261 standard, quantizer step sizes can be changed every GOB or every macroblock, the latter costing more in overhead bits than the former.)

The goal of the quantizer is to match each of these desired or predicted numbers as closely as possible when later encoding the error image. A best guess for the appropriate quantizer step size for encoding the error image is determined at 325, using the average step size of the last frame as an initial guess, and adjusting the "guess" by the difference between the number of bits desired to code the current frame and the number of bits generated for the last frame and the relative accuracy of the current frame's prediction to the previous frame's prediction.

Finally, at 330, the encoder DCT codes each 8×8 block and applies the selected quantizer step size to encode the resulting coefficients associated with each 8×8 block. The encoder pauses every K macroblocks to compare the actual number of bits generated to the expected number of bits determined at 320. The step size for the next K macroblocks is adjusted accordingly. If the estimates from 310, 320 and 325 were exact, no adjustment would be needed and the encoder would generate precisely the number of bits desired at 305. This seldom occurs in practice, so that the step size refinement of 330 operates to keep the deviation small. At 335, the process begins for the next frame of video. In the illustrated embodiment, K equals 33, corresponding to a GOB under the CCITT H.261 standard. In other embodiments of the invention, a trade-off exists between the value of K and the granularity of the step adjustment process (bearing in mind that an adjustment of the step size carries with it an overhead cost).

Figure 5:
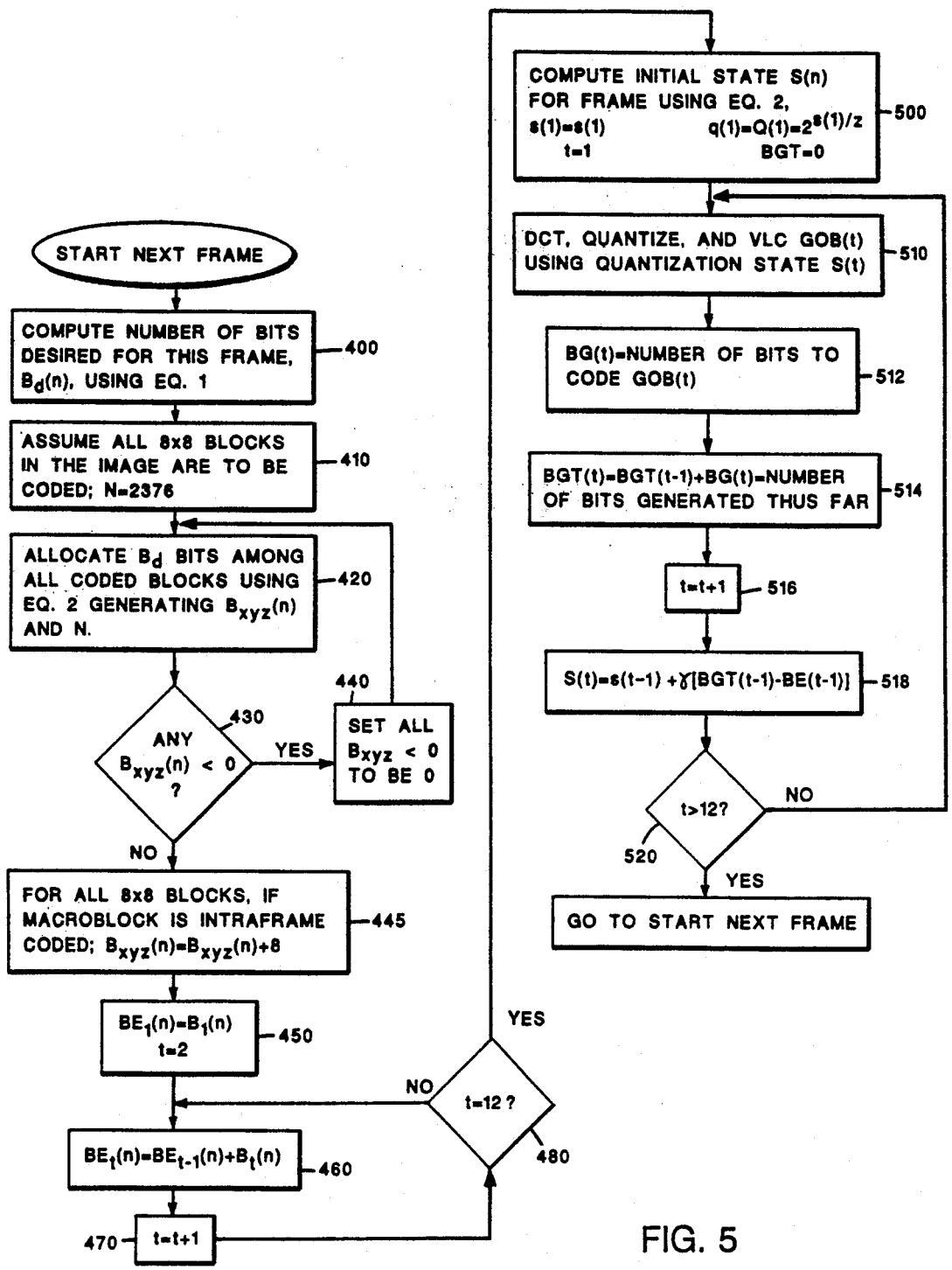
FIG. 5 is a detailed flowchart illustrating operation of the transmitter and in particular quantizer 17, in accordance with a preferred embodiment of the invention.

Referring to FIG. 5 the operation of the encoder with regard to setting quantizer step size, is described in greater detail. In this connection, a number of definitional terms are employed for convenience and those terms are denumerated in detail as follows:

$B(n)$ = Channel buffer level when coded frame n was sampled.
$B_d(n)$ = Desired bits for frame n.
R = Channel Rate in bits per second.
$B_m$ = Nominal channel buffer level (R/30 in our case).
$B_f(n)$ = Number of bits generated for frame n.
$B_{xyz}(n)$ = Number of bits allocated to an 8×8 block (x,y,z) for frame n.

$$B_{xy}(n) = \sum_{z=1}^{6} B_{xyz} = \text{Number of bits allocated to macroblock } B_{xy}.$$

$$B_x(n) = \sum_{y=1}^{33}\sum_{z=1}^{6} B_{xyz} = \text{Number of bits allocated to GOB } B_x.$$

BE(t) = Number of bits expected after coding GOB's (1 through t).
$E_{xyz}(n)$ = Prediction error energy for 8×8 block (x,y,z). (Intrablocks use AC energy only).
$E_{TOTAL}(n)$ = Geometric mean of energy in all (N) blocks allocated a non-negative number of bits.
BG(t) = Number of bits used to code GOB "t."
BGT(t) = TOTAL number of bits used to code GOB's 1 through t.

Referring to FIG. 4, the number of desired bits is determined at 400, using Equation 1 below.

$$B_d(n) = R/(\text{desired frame rate}) + B_m - B(N-1) - \text{fixed values} \quad (\text{Eq. 1})$$

In accordance with Equation 1, there is further subtracted from the desired number of bits the "fixed values," that is, the number of motion bits (that is, the number of bits required to describe motion compensation, the number of intraframe DC bits which are carried separately as noted below, and a number of other overhead bits which are removed from the channel rate. Once the desired number of bits has been determined, the total number of possible blocks is measured, first assuming that all of the 8×8 blocks in the image will be coded. This is indicated at 410. In the illustrated embodiment of the invention, the number of blocks is 2,376.

The system then allocates the desired number of bits among the coded blocks using Equation 2 below.

$$B_{xyz}(n) = B_d(n)/N(n) + \tfrac{1}{2} Log_2(E_{xyz}(n)/E_{TOTAL}(n)) \quad \text{Eq. 2)}$$

This process is performed iteratively as indicated at 420, 430 and 440. Those blocks for which the allocated bit value is less than zero, as measured at 430, are declared not coded, as indicated at 440, and the iterative process at 420 is repeated using Equation 2. The value of N(n) thus changes at each iteration as does the value of $E_{TOTAL}(n)$. In a typical system, the number of iterations is about six. Thereafter, the number of allocated bits for those blocks in a macroblock which are to be coded by intraframe coding, is increased by eight bits representing the eight DC bits. This is indicated at 445.

The system next initializes the expected and targeted bit values at the end of each GOB. This is performed at 450, 460, 470 and 480. At 450, the first target expected value is initialized and the value of "t" is set to two. Thereafter, the expected target value at the end of each succeeding macroblock is determined; and after all expected target values have been calculated, the system computes an initial quantizer step value for the frame using the following equation 3:

$$S(n) = S(n-1) + (\alpha C/N(n))(B_g(N-1) - B_d(n)) + \beta(Log_2((n(n)E_{TOTAL}(n))/(N(n-1)E_{TOTAL}(n-1)))) \quad \text{(Eq. 3)}$$

The quantizer values are determined by the state values S and the state s for the first GOB is set to the initial state S for the frame. This is indicated at 500. (As noted at 500, the quantization step size "q" is equal to $2^{s(t)/z}$ where z is a constant, 10 is the illustrated embodiment, and the state s(t) is limited between the values of "0" and $S_{max}$. In the illustrated embodiment $S_{max}$ equals 50. In addition, at 500, the number of bits actually generated is initialized to "0."

At 510, the encoder finds the discrete cosine transform (DCT), quantizes the coefficients, and variably encodes the first set of quantization values corresponding to the initial state, s(1), for the first GOB. The number of bits actually generated for the current "GOB" is accumulated at 512 and the accumulated number of bits actually transmitted is determined at 514. The system increments the "GOB number" to the next GOB at 516 and calculates a new step size at 518 in accordance with equation 4.

$$S(t) = S(t-1) + \gamma(BGT(t-1) - BE(t-1)) \quad \text{(Eq. 4)}$$

Thus, as each GOB is encoded, the encoder compares the total expected number of bits to encode the image through the last GOB, BE(t−1), with the actual total number of bits required, based upon the quantization steps used for the image up until the last GOB, BGT(t−1), and modifies the step size, if necessary, based upon that difference. In this manner the number of bits actually used to encode an image is constantly optimized at the end of each GOB (or sector) to approximate, closely, the desired number of bits to be used for the image. When all of the GOB's or sectors of an image have been encoded, as tested at 520, the system proceeds to encode the next frame. A preferred value for γ is 0.005.

A brief discussion of equations 1, 2 and 3 will be helpful to a clearer understanding of the claimed invention.

Equation (1), the Forward Quantizer Control Equation, provides for measuring B(n−1) at the instant in time just prior to loading the bits for frame (n−1) into the transmit buffer 18a. $B_m$ is a constant whose value can strongly influence the performance of the method of the invention. In the preferred implementation, $B_m = R/30$ works well for bit rates from 112-384 Kbit/s. Ideally, B(n−1) would always equal $B_m$. If the encoder were running at roughly 15 frames/second, $B_m = R/30$ means that about half of the previous frame's bits would still be in the transmit buffer immediately prior to loading the bits for frame (n−1). At 7.5 frames/second, about one quarter of the previous frame's bits should still be in the buffer. $B_m$ needs to be large enough to minimize the probability that the buffer will under run, but not so large that the buffer adds appreciable delay and frame skipping, interfering with motion handling.

Note also that $B_d(n)$ does not include bits which are already known with great accuracy, such as those needed to describe motion vectors, encode DC coefficients, or perform other overhead functions (for example, synchronization and coding control) which can be sent as side information over line SI (FIGS. 1 and 2).

Equation (2), the Bit Allocation Formula, is familiar to those in the field. Equation (2) estimates how many of the total pool of $B_d(n)$ bits are expected to be allocated to the 8×8 block "xyz" having energy $E_{xyz}(n)$. Blocks having energy larger than the geometric mean $E_{TOTAL}(n)$ get more than the average $B_d(n)/N$ bits. Equation (2) can allocate a negative number of bits to a block having very small energy, which is not acceptable. For this reason, the encoder iterates equation (2), each time eliminating from consideration those blocks receiving a negative allocation. The iteration terminates when equation (2) yields non-negative bit allocations for all candidate blocks, numbering "N" (less than or equal to 2376 for 352×288 pixel color images (FCIF resolution)). It is interesting and important to note that (a) this allocation equation is far from precise, and nevertheless the robust nature of the method allows the encoder to still work well. Furthermore other bit allocation methods could be employed.

Equation (3), the Frame by Frame Quantizer Control State Update Equation is taken from information theory. Those practiced in the field know that quantizer step size increases approximately exponentially with bit rate, assuming high rate and a memoryless source. This relationship is captured using equation (3). Note that S(n) = S(n−1) if the current frame's desired number of bits $B_d(n)$ equals the last frame's actual (generated) number of bits $B_g(n-1)$ and if both frame's prediction error images have the same total energy (since log 1 is zero). These two correctional terms, weighted by alpha and beta, bias the state variable S(n) in the desired direction, since the frame's step size $Q(n) = 2^{S(n)/z}$ and a larger step size results in fewer bits per frame. (In the H.261 standard, step sizes Q(n) and q(n) are constrained to the set of even integers from 2 to 62.)

Since $B_d(n)$ does not include the bits needed to encode the DC term of intra-encoded macroblocks, $E_{TOTAL}(n)$ does not include the energy of these DC terms. More specifically, $E_{TOTAL}(n)$ is the geometric mean of all intrablock AC coefficient energies and interblock DC and AC coefficient energies, where the geometric mean of the set $\{a(i), i=1, \ldots, n\}$ equals the nth root of their product. Note that if $N(n)E_{TOTAL}(n)$ is greater than $N(n-1)E_{TOTAL}(n-1)$, the encoder selects a larger state S(n), hence a larger initial step size Q(n). Otherwise, the encoder may generate excess bits.

Additions, subtractions, and other modifications of the preferred embodiments of the invention will be apparent to those practicing in the field and are within the scope of the following claims.

What is claimed is:

1. A method for selecting an initial quantizer step size for use in encoding an image frame, each frame having a plurality of sectors, and each sector being divided into a plurality of blocks, the method comprising the steps of selecting a quantizer step size equal to the quantizer step size of a previously encoded frame, adjusting said selected step size by a weighted function of the difference between the actual number of bits used to encode a previous frame and a desired number of bits for coding the present frame, the weighting function being a preselected first constant divided by the number of blocks expected to be encoded, and adjusting said now modified selected quantizer step size a second weighted function of the logarithm of the ratio of the geometric mean of the total energy of the number of blocks actually to be encoded for this frame multiplied by the number of blocks expected to be encoded, and the total energy of the number of blocks actually encoded for the previous frame multiplied by the number of blocks expected to be encoded in the previous frame.

2. The method of claim 1 wherein the first weighting function is about 24.

3. The method of claim 1 wherein the second weighted function is a constant having a value of about 0.004.

4. A method for transmitting a selected number of bits for representing an encoded image, the number of bits being transmitted being a function of a quantizer step size, said image being comprised of a plurality of sectors, each sector being comprised of a plurality of blocks, said method comprising the steps of determining a desired number of bits to be allocated to each sector, transmitting said sectors in a selected sequence, and associating a quantizer step size with each sector, said associating step comprising setting the quantizer step size for a sector as a function of the difference in number of bits actually transmitted for all previous sectors of the image and the desired number of bits to be transmitted for all previous sectors of the image.

5. The method of claim 4 further comprising the step of multiplying said difference by a weighting constant.

6. The method of claim 5 wherein said constant is about 0.005.

7. A method for transmitting a selected number of bits for representing an encoded image, the number of bits being transmitted being a function of a quantizer step size, said image being comprised of a plurality of sectors, each sector being comprised of a plurality of blocks, said apparatus comprising the step of allocating available bits to blocks of the image to be encoded according to the relationship $B(n) = B_d(n)/N(n) + \frac{1}{2}Log_2(E(n)/E_{TOT}(n))$ where B(n) is the number of bits allocated to block B for frame n;

N(n) is the number of blocks of frame n actually coded;

$B_d(n)$ is the desired number of bits allocated to code frame n;

E(n) is the prediction error energy for block B of frame n (wherein the DC component is omitted for intrablocks); and $E_{TOT}(n)$ is the geometric mean of energy for all blocks (N) actually to be coded for frame n.

8. An apparatus for selecting an initial quantizer step size for use in encoding an image frame, each frame having a plurality of sectors, and each sector being divided into a plurality of blocks, the apparatus comprising means for selecting a quantizer step size equal to the quantizer step size of a previously encoded frame, means for adjusting said selected step size by a weighted function of the difference between the actual number of bits used to encode a previous frame and a desired number of bits for coding the present frame, the weighting function being a preselected first constant divided by the number of blocks expected to be encoded, and means for adjusting said now modified selected quantizer step size by a second weighted function of the logarithm of the ratio of the geometric mean of the total energy of the number of blocks actually to be encoded for this frame multiplied by the number of blocks expected to be encoded, and the total energy of the number of blocks actually encoded for the previous frame multiplied by the number of blocks expected to be encoded in the previous frame.

9. The apparatus of claim 8 wherein the first weighting function is about 24.

10. The apparatus of claim 8 wherein the second weighted function is a constant having a value of about 0.004.

11. An apparatus for transmitting a selected number of bits for representing an encoded image, the number of bits being transmitted being a function of a quantizer step size, said image being comprised of a plurality of sectors, each sector being comprised of a plurality of blocks, said apparatus comprising means for determining a desired number of bits to be allocated to each sector, means for transmitting said sectors in a selected sequence, and means for associating a quantizer step size with each sector, said associating means comprising means for setting the quantizer step size for a sector as a function of the difference in number of bits actually transmitted for all previous sectors of the image and the desired number of bits to be transmitted for all previous sectors of the image.

12. The apparatus of claim 11 further comprising means for multiplying said difference by a weighting constant.

13. The apparatus of claim 12 wherein said constant is about 0.005.

14. An apparatus for transmitting a selected number of bits for representing an encoded image, the number of bits being transmitted being a function of a quantizer step size, said image being comprised of a plurality of sectors, each sector being comprised of a plurality of blocks, said apparatus comprising means for allocating available bits to blocks of the image to be encoded according to the relationship $B(n) = B_d(n)/N(n) + \frac{1}{2}Log_2(E(n)/E_{TOT}(n))$ where B(n) is the number of bits allocated to block B for frame n;

N(n) is the number of blocks of frame n actually coded;

$B_d(n)$ is the desired number of bits allocated to code frame n;

E(n) is the prediction error energy for block B of frame n (wherein the DC component is omitted for intrablocks); and $E_{TOT}(n)$ is the geometric mean of energy for all blocks (N) actually to be coded for frame n.

* * * * *

UNITED STATES PATENT AND TRADEMARK OFFICE
CERTIFICATE OF CORRECTION

PATENT NO. : 5,283,646
DATED : February 1, 1994
INVENTOR(S) : John E. Bruder

It is certified that error appears in the above-indentified patent and that said Letters Patent is hereby corrected as shown below:

Col. 8, line 40, "(Eq.1" should be --(Eq. 1)--.

Col. 8, line 58, "Eq.2)" should be --(Eq. 2)--

Col. 9, line 12, the equation should read:

$$S(n)=S(n-1) +\alpha(N(n))(B_q(N-1)-B_d(n)+\beta(Log_2(N(n)E_{TOTAL}(n))/(N/n-1)E_{TOTAL}(n-1)))$$

Signed and Sealed this

Eighth Day of August, 1995

Attest:

BRUCE LEHMAN

Attesting Officer

Commissioner of Patents and Trademarks